United States Patent
Summers

(10) Patent No.: US 12,022,778 B2
(45) Date of Patent: Jul. 2, 2024

(54) ROOT IRRIGATION APPARATUS

(71) Applicant: Robert G Summers, Pasadena, CA (US)

(72) Inventor: Robert G Summers, Pasadena, CA (US)

(*) Notice: Subject to any disclaimer, the term of this patent is extended or adjusted under 35 U.S.C. 154(b) by 0 days.

(21) Appl. No.: 17/694,636

(22) Filed: Mar. 14, 2022

(65) Prior Publication Data
US 2022/0287253 A1    Sep. 15, 2022

Related U.S. Application Data

(60) Provisional application No. 63/161,297, filed on Mar. 15, 2021.

(51) Int. Cl.
*A01G 25/06* (2006.01)

(52) U.S. Cl.
CPC ..................... *A01G 25/06* (2013.01)

(58) Field of Classification Search
CPC ................. A01G 29/00; A01G 25/06
See application file for complete search history.

(56) References Cited

U.S. PATENT DOCUMENTS

| | | | | |
|---|---|---|---|---|
| 419,242 A * | 1/1890 | Brown | ............ | A01G 29/00 405/39 |
| 1,058,138 A * | 4/1913 | Ballou | ............ | A01G 29/00 111/99 |
| 2,375,860 A * | 5/1945 | Markham | ............ | A01G 29/00 47/48.5 |
| 2,379,160 A * | 6/1945 | Haven | ............ | A01G 29/00 604/207 |
| 2,990,647 A * | 7/1961 | Himebaugh | ............ | A01G 29/00 D8/1 |
| 3,471,968 A * | 10/1969 | Letz | ............ | A01G 29/00 248/125.3 |
| 3,821,863 A * | 7/1974 | Chan | ............ | A01C 21/00 47/48.5 |
| 4,697,952 A * | 10/1987 | Maddock | ............ | A01G 25/06 405/36 |
| 4,726,143 A * | 2/1988 | Steinbeck | ............ | A01G 29/00 47/48.5 |
| 4,745,706 A * | 5/1988 | Muza | ............ | A01G 9/122 47/47 |
| 4,866,880 A * | 9/1989 | Weinblatt | ............ | A01G 29/00 222/650 |
| 5,349,780 A * | 9/1994 | Dyke | ............ | A01G 9/122 248/188.5 |
| 5,605,010 A * | 2/1997 | Furlong | ............ | A01G 29/00 47/47 |
| 5,746,021 A * | 5/1998 | Green | ............ | A01M 1/2005 43/132.1 |
| 5,795,100 A | 8/1998 | Thomas | | |
| 5,881,495 A * | 3/1999 | Clark | ............ | A01G 25/02 52/165 |

(Continued)

FOREIGN PATENT DOCUMENTS

CN    108719012 A * 11/2018 ............ A01G 25/06

*Primary Examiner* — Monica L Perry
*Assistant Examiner* — Aaron M Rodziwicz

(57) ABSTRACT

A root irrigation apparatus includes a chamber including a first end, a second end, and, an irrigation aperture, a valve operably connected to the first end of the chamber, and, a cap configured to couple to the first end of the chamber.

7 Claims, 23 Drawing Sheets

(56) References Cited

U.S. PATENT DOCUMENTS

| | | | | |
|---|---|---|---|---|
| 5,996,279 | A * | 12/1999 | Zayeratabat | A01G 29/00 47/48.5 |
| 6,299,125 | B1 * | 10/2001 | Zayeratabat | A01G 29/00 47/42 |
| 6,702,239 | B2 * | 3/2004 | Boucher | A01G 17/04 248/230.8 |
| 6,772,558 | B2 * | 8/2004 | Mancini | A01G 29/00 47/42 |
| 6,984,090 | B2 * | 1/2006 | Allen | E03F 1/002 405/45 |
| 7,007,910 | B1 * | 3/2006 | Krinner | E04H 12/2223 52/165 |
| 7,225,585 | B2 * | 6/2007 | Zayeratabat | A01G 29/00 47/47 |
| 8,065,832 | B2 * | 11/2011 | King | A01G 29/00 47/79 |
| 8,533,995 | B1 * | 9/2013 | Behbehani | A01G 27/006 47/79 |
| 8,806,804 | B2 * | 8/2014 | Ahumada Perez | A01G 7/06 47/57.5 |
| 9,055,718 | B2 | 6/2015 | Geerligs | |
| 9,392,755 | B1 * | 7/2016 | Lantis | A01G 27/00 |
| 10,602,684 | B2 * | 3/2020 | Natkiel | A01G 27/008 |
| 2009/0031626 | A1 * | 2/2009 | Peterson | A01G 29/00 47/48.5 |
| 2011/0056128 | A1 * | 3/2011 | King | A01G 29/00 47/48.5 |

\* cited by examiner

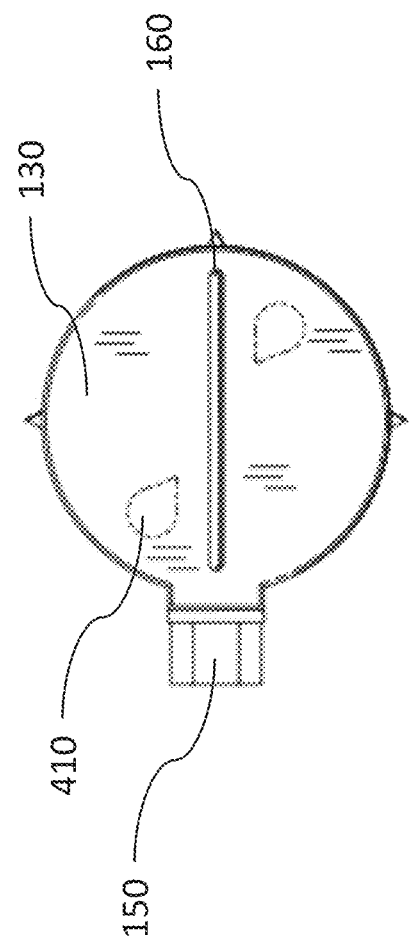

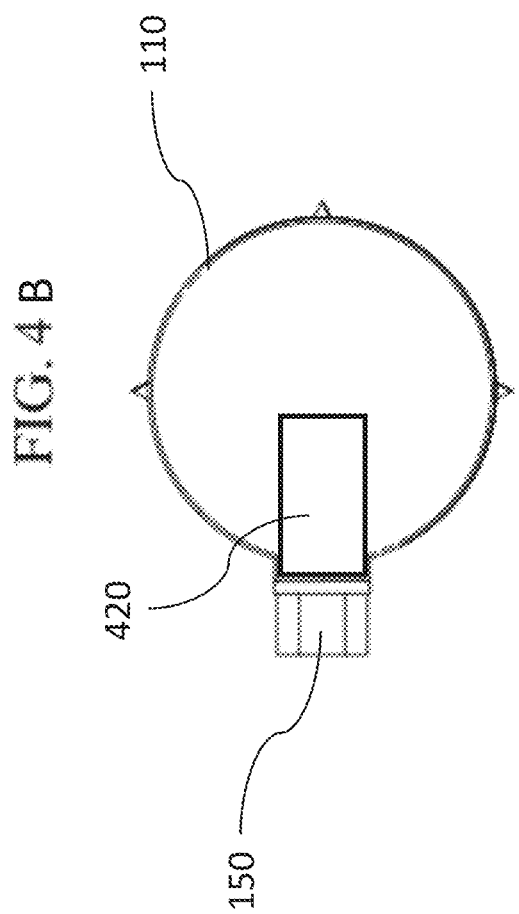

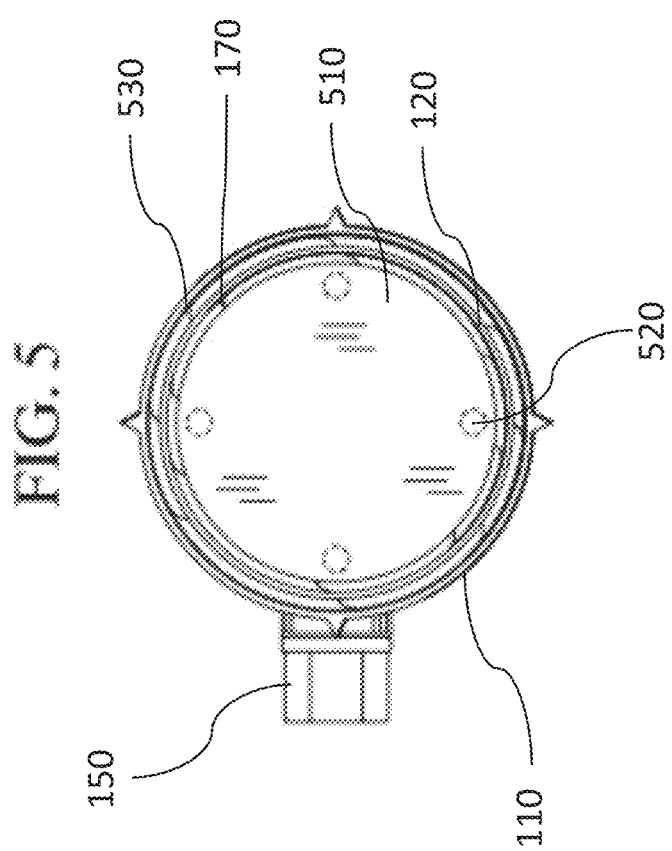

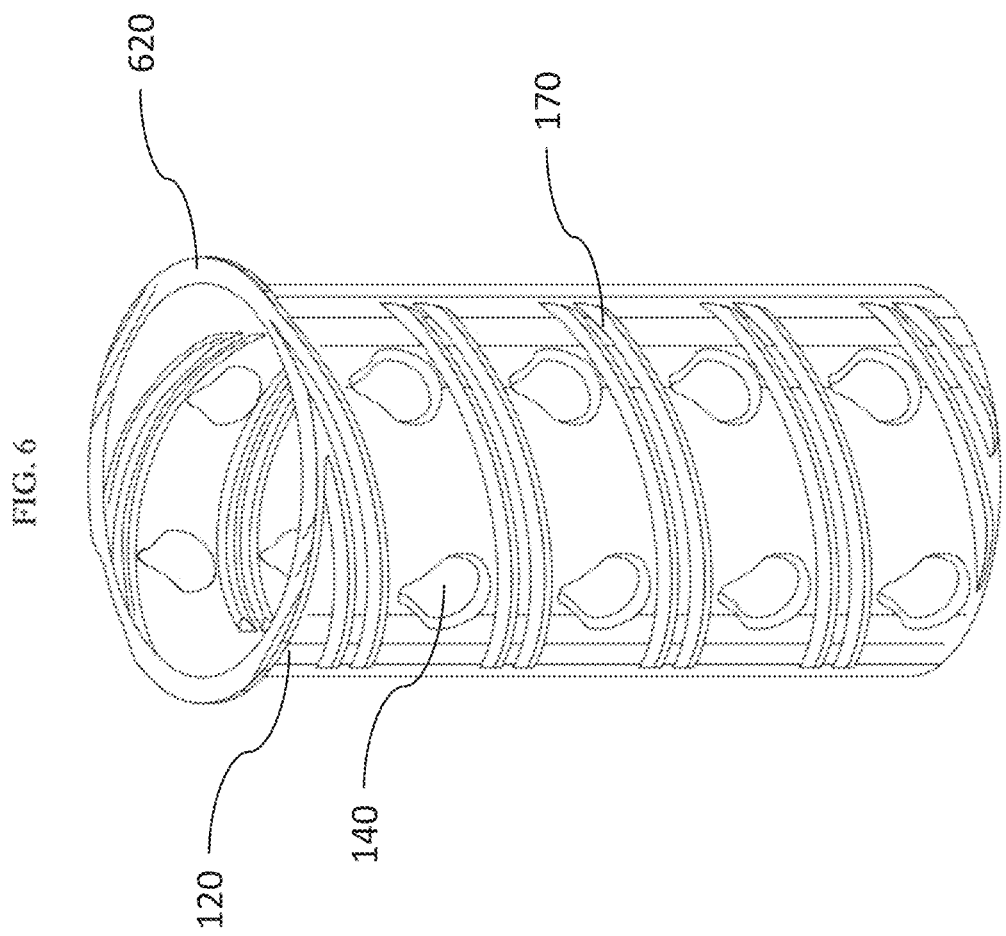

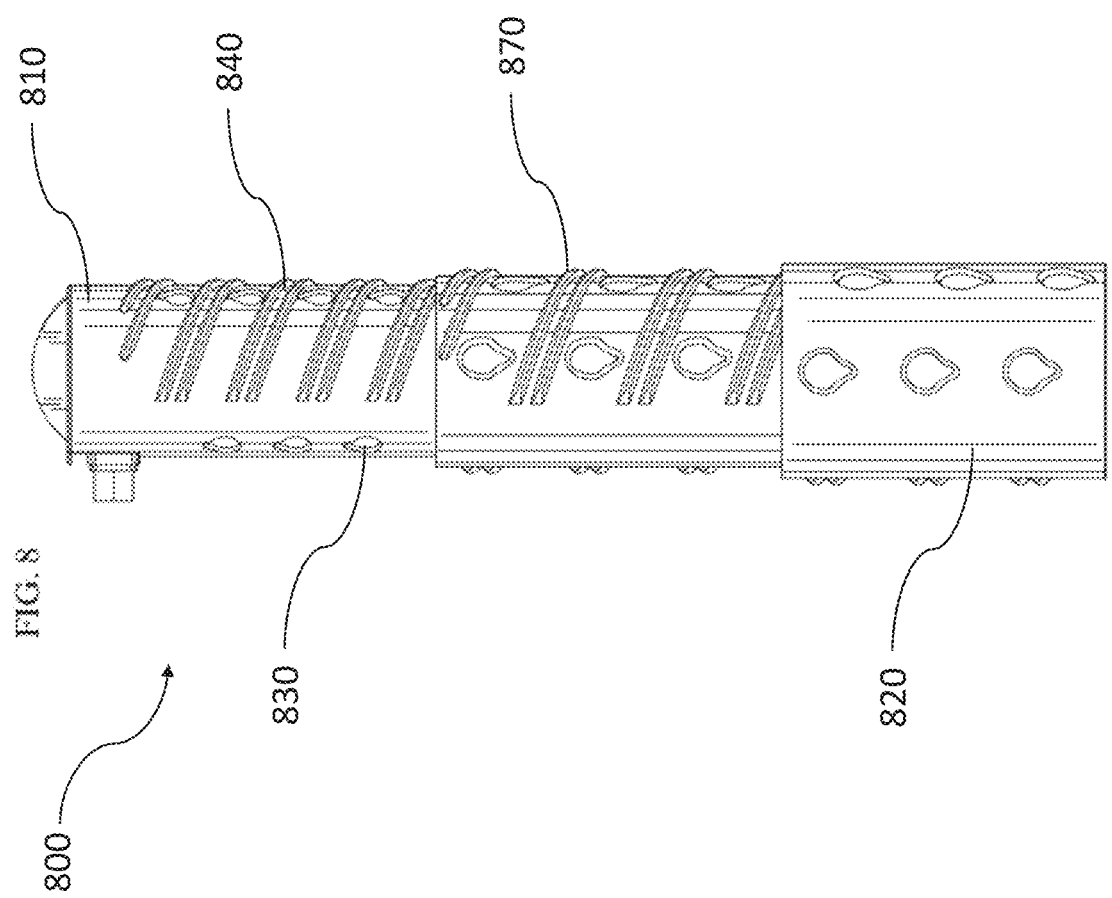

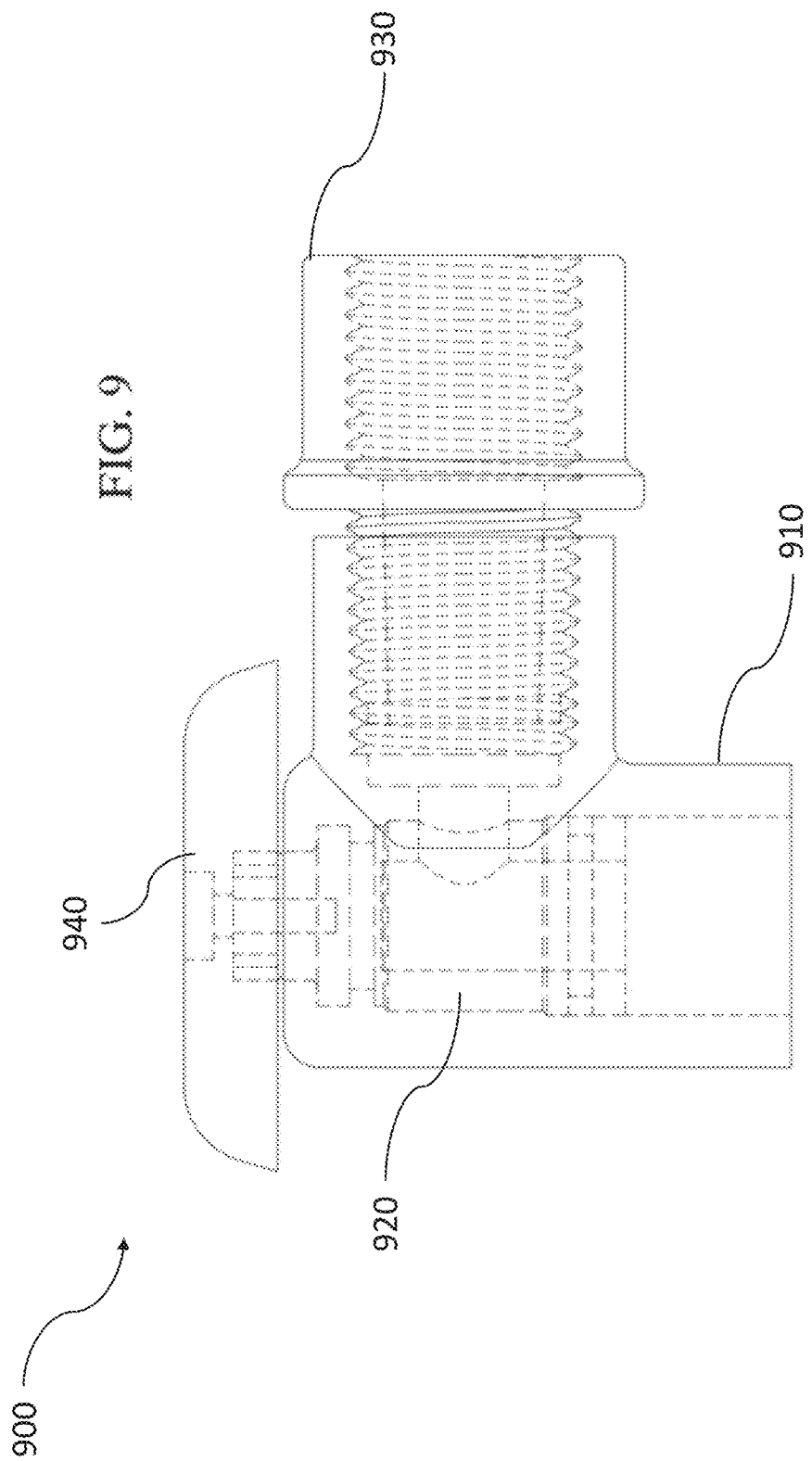

ROOT IRRIGATION APPARATUS

CROSS REFERENCE TO RELATED APPLICATION

This application claims the benefit of U.S. Provisional Application Ser. No. 63/161,297, filed Mar. 15, 2021, the entirety of which is incorporated by reference herein.

TECHNICAL FIELD

Embodiments of the present disclosure relate to the field of water irrigation and, more particularly, to irrigating plants, trees, shrubs, and other items that demand water.

BACKGROUND OF THE INVENTION

Generally, there are three types of irrigation methods: sprinklers, drip irrigation and soakers. Sprinklers require the use of devices that are above the surface and may require strong water pressure in order to effectively water the desired area. Unfortunately, a lot of water may be wasted due to evaporation or misaligned sprinkler heads that spray outside the desired zone.

Drip irrigation and Soakers are slow dripping water systems. This may include soaking hoses or drip irrigation heads. Unfortunately, soaking systems are just as prone to evaporation and misdirected irrigation if not properly maintained.

To overcome the problems and limitations described above, there is a need for a root irrigation apparatus that can deliver water or other fluids to a root system while avoiding unwanted fluid exposure that results in evaporation.

By using a root irrigation apparatus, a user may obviate the need for use of the current offering of watering systems because the root irrigation apparatus may deliver water to the root of the tree, shrub, bush, or any other plant that may require water while reducing water loss due to evaporation and/or runoff.

The root irrigation apparatus may thus provide the benefits of watering the root of the tree, shrub, bush, or any other plant that may require water in a manner that prevents evaporation or runoff and thereby conserves water.

SUMMARY OF THE INVENTION

One or more embodiments of the present disclosure may be directed to a root irrigation apparatus.

A root irrigation apparatus includes a chamber with a first end, a second end, and, an irrigation aperture, a valve operably connected to the first end of the chamber, and a cap configured to couple to the first end of the chamber.

The root irrigation apparatus may include an attachment body operably coupled to the second end of the chamber.

The root irrigation apparatus may have an upper end of the attachment body configured to operably couple to an interior surface of the chamber.

The root irrigation apparatus may have the attachment body further include an auger coupled to a lower end of the attachment body.

The root irrigation apparatus may have the chamber further include an auger coupled to the second end of the chamber.

The root irrigation apparatus may have the valve configured to be housed within an interior volume of the chamber and communicably coupled to a port connected to an exterior surface of the first end of the chamber.

The root irrigation apparatus may have the port is configured to couple to a hose.

The root irrigation apparatus may have the valve include a check valve.

The root irrigation apparatus may have the valve include a right-angle valve.

A telescoping root irrigation apparatus having a chamber includes a first end, a second end, an irrigation aperture, and a first threaded portion running along a first surface of the chamber, a valve operably connected to the first end of the chamber, a cap configured to couple to the first end of the chamber, and an attachment body having a second surface including a second threaded portion configured to mate with the first threaded portion of the chamber.

The telescoping root irrigation apparatus may have a length of the attachment body extending beyond the chamber that may be set according to an amount of the second threaded portion of the attachment body mated to the first threaded portion of the chamber.

The telescoping root irrigation apparatus may have a length of the chamber extending beyond the attachment body that may be set according to an amount of the second threaded portion of the attachment body mated to the first threaded portion of the chamber.

The telescoping root irrigation apparatus may have the attachment body further include an auger.

The telescoping root irrigation apparatus may have the valve configured to be housed within an interior volume of the chamber and communicably coupled to a port connected to an exterior surface of the first end of the chamber.

The telescoping root irrigation apparatus may have the valve include a check valve.

The telescoping root irrigation apparatus may have the valve include a right-angle valve.

A method for installing a root irrigation apparatus includes determining a root system depth, digging a hole with a depth matching the root system depth in a ground surface, adjusting a length of the root irrigation apparatus to substantially match the root system depth, placing the root irrigation apparatus into the hole with a cap of the root irrigation apparatus being substantially level with the ground surface, and filing in a remaining volume of the hole.

The method for installing a root irrigation apparatus may include adjusting the length of the root irrigation apparatus to substantially match the root system depth by varying an amount of a first threaded portion of a chamber of the root irrigation apparatus mated to a second threaded portion of an attachment body of the root irrigation apparatus by twisting the attachment body of the root irrigation apparatus relative to the chamber of the root irrigation apparatus.

The method for installing a root irrigation apparatus may include coupling a tube to a port of the root irrigation device.

The method for installing a root irrigation apparatus may have the remaining volume of the hole filled in using gravel.

Problems That are to be Solved by the Invention

As mentioned previously, currently offered irrigation systems may require the user to choose sprinklers, drip irrigation, or soakers. The use of these devices may result in a less efficient watering system that wastes water due to evaporation or runoff. Therefore, there is a need for a root irrigation apparatus that can deliver water or other fluids to a root system while avoiding unwanted fluid exposure that results in evaporation and/or runoff.

Means for Solving the Problem

Use of a root irrigation apparatus may obviate the need for the user to rely on the current offering of watering systems because the root irrigation apparatus may deliver water to the roots of a tree, shrub, bush, or any other plant that may require water. The root irrigation apparatus may deliver water to the soil beneath the surface of the ground, and thereby avoid waste created by evaporation and runoff. Thus, the root irrigation apparatus of the present disclosure may, in some embodiments, provide an improved irrigation option that may be extensible, include an auger for ease of installation, a removable cap, and a valve for controlling flow rate into the root irrigation apparatus.

Effect of the Invention

The root irrigation apparatus may provide the benefits of watering the root of the tree, shrub, bush, or any other plant that may require water and prevent evaporation or runoff and thereby conserve water. Furthermore, the use of the root irrigation apparatus may provide economic benefit, by reducing excess water usage, and societal benefit by promoting resource conservation.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 4A is a top-down view of an embodiment of a root irrigation apparatus according to some aspects of the present disclosure;

FIG. 4B is a schematic view from a top-down perspective of an embodiment of a root irrigation apparatus according to some aspects of the present disclosure;

FIG. 5 is a bottom-up view of an embodiment of a root irrigation apparatus according to some aspects of the present disclosure;

FIG. 6 is a perspective view of an embodiment of an extension body according to some aspects of the present disclosure;

FIG. 8 is a lateral view of another embodiment of a root irrigation apparatus according to some aspects of the present disclosure;

FIG. 9 is a schematic view from a lateral perspective of an adjustable valve according to some to aspects of the present disclosure;

DETAILED DESCRIPTION

Figure 1:
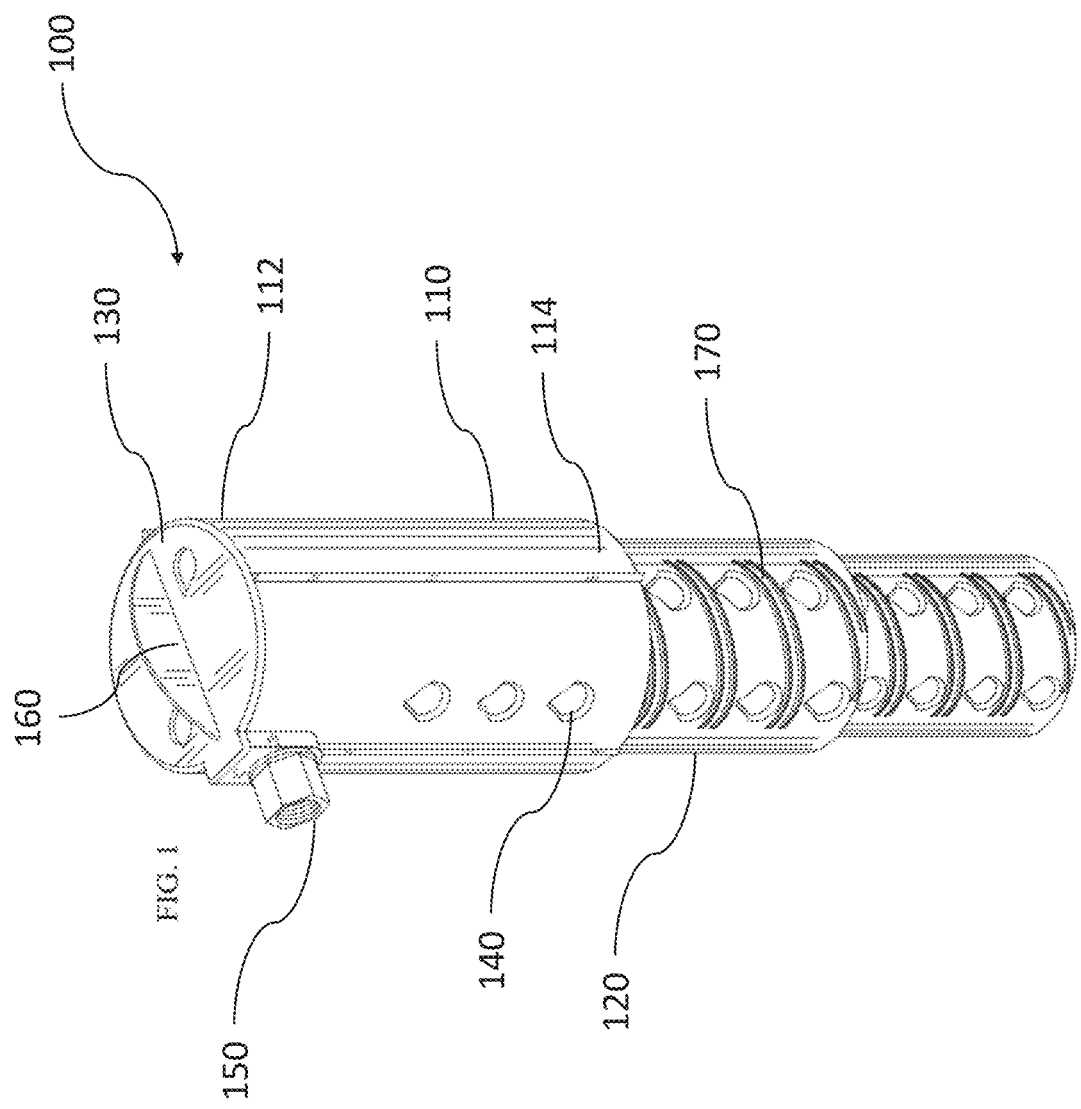
FIG. 1 is a perspective view of an embodiment of a root irrigation apparatus according to some aspects of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments according to the present disclosure will now be described. As described previously, a user may choose to use sprinklers, drip irrigation, or soakers to irrigate trees or other plants, but these offerings may result in inefficient watering systems that waste water due to evaporation or runoff. Use of a root irrigation apparatus according to some embodiments of the present disclosure may obviate the need for the user to the current offering of watering systems because the root irrigation apparatus may deliver water in a subterranean manner to the root of the tree, shrub, bush, or any other plant that may require water. Some embodiments of the present disclosure may thus provide the benefits of watering the root of a tree, shrub, bush, or any other plant that may require water and prevent evaporation or runoff and thereby conserve water.

For the purposes of this application, the words tree, plant, shrub, or bush may be understood to be interchangeable with each other, unless otherwise specified. Moreover, the words "chamber," "housing unit," and "unit" may be interchangeable with each other, unless otherwise specified. Likewise, the terms "thread" and "threaded portion" may be interchangeable with each other, unless otherwise specified.

FIG. 1 is a perspective view of an embodiment of a root irrigation apparatus 100 according to some aspects of the present disclosure. In some embodiments, the root irrigation apparatus 100 may include a chamber 110 having a first end 112, a second end 114, and an irrigation aperture 140.

In some embodiments, the chamber 110 may be configured to be operably placed approximately beneath the surface and approximately adjacent to the roots of a plant. The chamber 110 may be made of PVC plastic, biodegradable plastic, metal, or any other material known by one skilled in the art to be suitable for subterranean use and the chamber 110 may be molded, stamped, forged, cast, printed or made by any other method known to one skilled in the art. The chamber 110 may, in some embodiments, be an elongated cylindrical body with a first end 112 or top portion and a second end 114 or bottom. As will be appreciated by one skilled in the art, other shapes for the chamber 110 may be used within the scope of the present disclosure. As a non-limiting example, a square shape may be used for the chamber 110 and corresponding attachment body 120. Likewise, other polygonal shapes may, in some embodiments, be used within the scope of the present disclosure. In some embodiments, having a cylindrical chamber 110 may provide increased strength and ease of use for adjusting the length of the root irrigation apparatus 100.

The chamber 110 may include, in some embodiments, additional structures, such as grooves or ridges on an exterior surface of the chamber. Additionally, in some other embodiments, rods (not depicted) may be extended from the chamber 110 to aid in placement of the root irrigation apparatus 100 by a user.

An irrigation aperture 140 may, in some embodiments, be incorporated into the chamber 110 to provide a path for fluid flow from the interior of the chamber 110 to the external environment adjacent to the root system the user intends to irrigate. In some embodiments, a plurality of irrigation apertures 140 may be used, and these may be arranged in any manner along the length of the chamber 110. This may include rows or groups of irrigation apertures 140 spaced in a pattern from one another. Moreover, in other embodiments, the plurality of irrigation apertures 140 may be arranged in a perpendicular pattern, horizontal pattern, or any combination thereof. The irrigation aperture 140 may be round, square, ovoid, or any other shape known by one skilled in the art for facilitating fluid flow. A mesh covering may, in some embodiments, be used to cover the irrigation aperture 140 to prevent soil or other surrounding substances from entering the chamber 110.

In some embodiments of the present disclosure, a valve (see 420 of FIG. 4B below) may be operably connected to the first end 112 of the chamber 110.

The root irrigation apparatus 100 may, in some embodiments, include a cap 130 configured to couple to the first end 112 of the chamber 110. The cap 130 may be constructed of PVC plastic, biodegradable plastic, metal, or any other material known by one skilled in the art to be suitable and may be molded, stamped, forged, cast, printed or made by any other method known by one skilled in the art to be suitable. Moreover, the cap 130 may have one or more irrigation cap-apertures (see 410 of FIG. 4A). In some embodiments, the irrigation cap-apertures (see 410 of FIG. 4A) may include a mesh covering or be partially exposed.

The cap 130 may, in some embodiments, have an exposed opening wherein a partial wheel may be located underneath the cap and allow the user to expose the inside of the unit. This opening may be covered by mesh, have holes, or other mechanisms to prevent debris from entering the chamber 110.

In some embodiments, the cap 130 may be secured to the first portion of the chamber using friction, but any suitable means for securing the cap 130 may be utilized within the scope of the present disclosure. In some embodiments, a hinge (not depicted) may be used to secure the cap 130 to the chamber 110 while allowing for the cap 130 to open and close the first end 112 of the chamber 110. In some embodiments, a lock (not depicted) may be used to prevent unauthorized removal of the cap 130. In some of these embodiments, a locking rod (not depicted) may be extended through the cap 130 and allow for connection of the lock (not depicted).

To aid in removal of the cap 130, some embodiments may include a handle 160. As will be appreciated by one skilled in the art, the size and geometry of the handle 160 may be varied to meet differing use cases, and these variations are within the scope of the present disclosure.

A user may use the root irrigation apparatus 100 to fertilize by opening the cap 130 and pouring in a desired amount of a suitable type of fertilizer. The root irrigation apparatus 100 may allow for fertilizing at the roots and may result in minimal loss of concentration or burning of the top roots. In some embodiments, the fertilizer may be effectively diluted and distributed to the plants' or trees' root system during use.

According to some aspects of the present disclosure, the root irrigation apparatus 100 may include, in some embodiments, an attachment body 120 operably coupled to the second end 114 of the chamber 110. In some other embodiments, two or more attachment bodies 120 may be used. The attachment body 120 may, in some embodiments, include an upper end (see 620 of FIG. 6) that may be configured to operably couple to an interior surface of the chamber 110. This feature of the attachment body 120 is described below in greater detail in regard to FIG. 6.

Like the chamber 110, the attachment body 120 may, in some embodiments, include one or more irrigation apertures 140. As described above in regard to the chamber 110, irrigation apertures 140 of the attachment body 120 may be arranged in rows or groups along the length of the attachment body 120. As will be appreciated by one skilled in the art, any arrangement of irrigation apertures 140 may be used within the scope of the present disclosure.

A length of the attachment body 120 extending beyond the chamber 110 may, in some embodiments, be adjusted using threads 170. The threads 170 may be mated to a corresponding chamber thread (530 of FIG. 5) on a surface of the chamber 110. Likewise, in embodiments that feature more than one attachment body 120, threads 170 may be used to extend subsequent attachment bodies 120 from the first, with each successive attachment body 120 having a smaller diameter. An alternative embodiment, with a reverse of this ordering, is depicted in FIG. 8.

In embodiments featuring the threads 170, a telescopic function may be enabled thereby allowing a user to vary the overall length of the root irrigation apparatus 100 to accommodate various root system depths. As a non-limiting example, some embodiments may allow a user to set an overall length of the root irrigation apparatus 100 using the threads 170 between lengths of 12-24 inches. In some other embodiments, this range may be increased to 12-36 inches. In still other embodiments, this range may be increased to 12-48 inches. As will be appreciated by one skilled in the art, variations in size and length of the chamber 110 and attachment body 120 are contemplated within the scope of the present disclosure. In other embodiments the chamber 110 may be as small as 2" and as large as 5" in diameter and extend to as much as 48" in length.

In some embodiments, the threads 170 and corresponding chamber threads (530 of FIG. 5) may proceed along the length of the chamber 110 or attachment body 120 at a constant rate. In such embodiments, the length of the root irrigation apparatus 100 may be infinitely adjustable within its range. In some other embodiments, other means for setting the length of the root irrigation apparatus 100 may be used as an alternative to threads such as interlocking teeth (not depicted). However, as will be appreciated by one skilled in the art, structures like interlocking teeth (not depicted) may only allow for discrete length adjustment.

Referring back to FIG. 1, in some embodiments, the root irrigation apparatus 100 may include a port 150. The port 150 may, in some embodiments, be located at or near the first end 112 of the chamber 110. The port 150 may also, in some embodiments, be operably coupled to the valve (420 of FIG. 4B) to facilitate controlled fluid flow into the chamber 110. As will be appreciated by one skilled in the art, various tubes and hoses configured to flow water or other fluids may be coupled to the port 150, and the port 150 may be varied in size and geometry to accommodate different tubes and hoses. In some embodiments, the port 150 may be threaded to mechanically retain a threaded portion of a tube of hose. However, as will be appreciated by one skilled in the art, any other suitable means for attaching the tube or pipe, including various adapters, may be used within the scope of the present disclosure. For example, a T-fitting may be used to allow for multiple root irrigation apparatuses 100 to be connected in series along an irrigation line. Likewise, in some embodiments, more than one port 150 may be included to allow for connection to multiple tubes or pipes.

In some other embodiments, the port 150 may feature an integrated tube or pipe (not depicted). As will be appreciated by one skilled in the art, the length and width of the integrated tube or pipe may be varied to meet varying use cases. As a non-limiting example, the tube may be flexible and 24 inches in length with ½ inch diameter.

Referring again to FIG. 1, a telescoping root irrigation apparatus 100 may, in some embodiments, include a chamber 110 having a first end 112, a second end 114, an irrigation aperture 140, and, a first threaded portion (530 of FIG. 5) running along a first surface of the chamber 110. The telescoping root irrigation apparatus 100 may also include a valve 420 operably connected to the first end of the chamber 110, a cap 130 configured to couple to the first end 112 of the chamber 110, and, an attachment body 120 having a second surface including a second threaded portion 170 configured to mate with the first threaded portion (530 of FIG. 5) of the chamber 110.

As will be appreciated by one skilled in the art, the first surface of the chamber 110 may be an interior surface which will accommodate an embodiment like that depicted in FIG. 1. In these embodiments, the length of the attachment body 120 extending beyond the chamber 110 can be set according to an amount of the second threaded portion 170 of the attachment body 120 mated to the first threaded portion (530 of FIG. 5) of the chamber 110. However, the first surface of the chamber 110 may, in other embodiments, be an outer surface to accommodate embodiments like those depicted in FIG. 8. Such embodiments are described in detail below in regard to FIG. 8.

To further assist one skilled in the art in practicing aspects of the present disclosure, additional views of an embodiment like that of FIG. 1 are provided.

Figure 2:
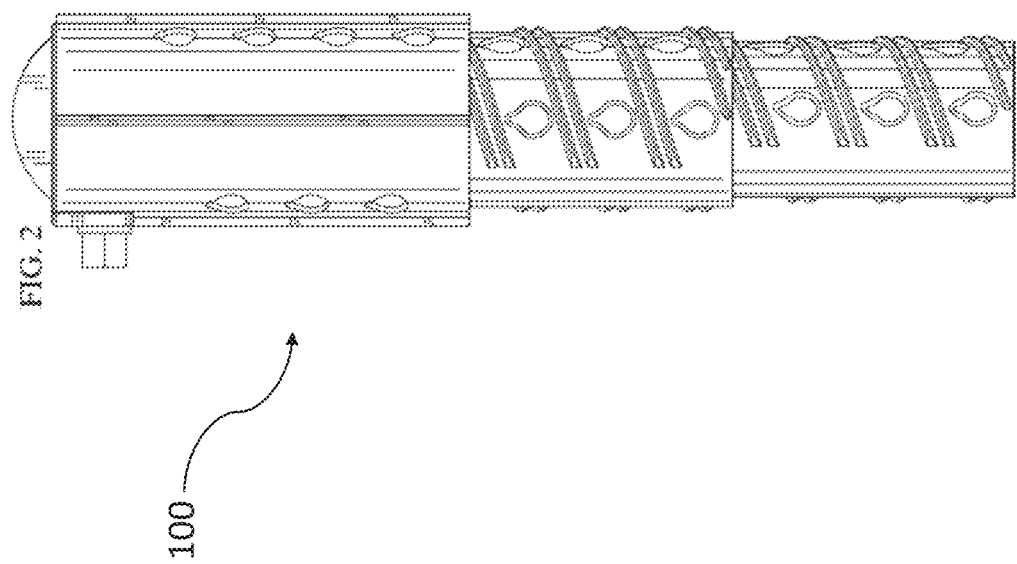
FIG. 2 is a lateral view of an embodiment of a root irrigation apparatus according to some aspects of the present disclosure.

In reference to FIG. 2, a lateral view of an embodiment of a root irrigation apparatus according to some aspects of the present disclosure is seen. As shown, a first attachment body 120 is extended beyond the chamber 110 with a second attachment body 120 extending beyond the first attachment body 120.

Figure 3:
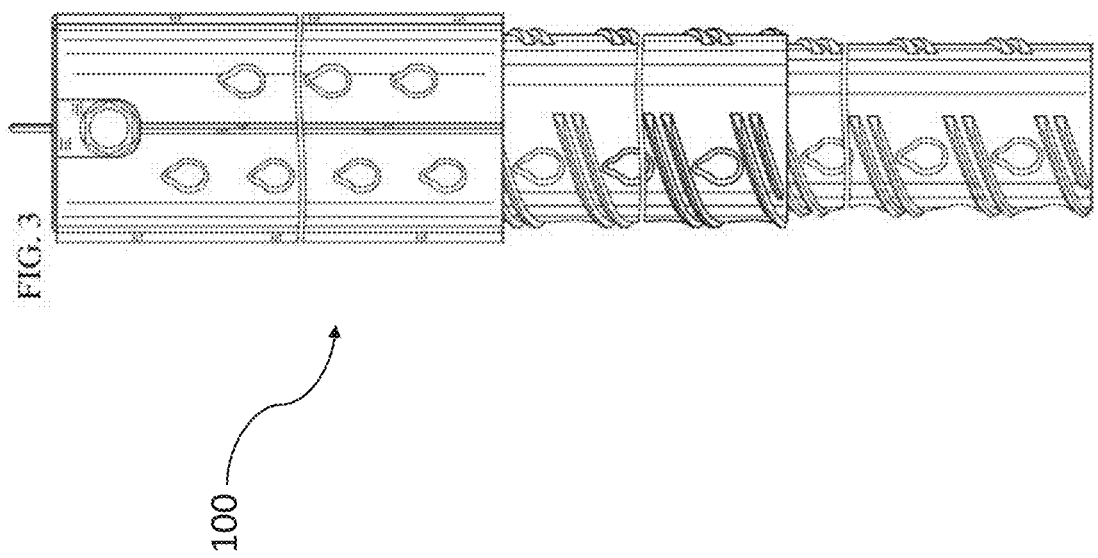
FIG. 3 is a frontal view of an embodiment of a root irrigation apparatus according to some aspects of the present disclosure.

In reference to FIG. 3, a frontal view of an embodiment of a root irrigation apparatus according to some aspects of the present disclosure is seen. As shown, a first attachment body 120 is extended beyond the chamber 110 with a second attachment body 120 extending beyond the first attachment body 120.

A non-limiting example of one embodiment of the present disclosure may be constructed of SCH 40 PVC as two 13" long sections, a chamber 110 and an attachment body 120) with the appropriate diameters to allow the attachment body 120 to fit within the chamber 110. The chamber 110 may be designed with a chamber thread (530 of FIG. 5) to allow the adjustment of the depth of the root irrigation apparatus 100 before installation. The root irrigation apparatus 100 may accommodate deep watering from 12" to 24" in depth. The root irrigation apparatus 100 may be 4" in diameter (at the chamber 100) and may have a valve (420 of FIG. 4B) at the top of the chamber 110 to regulate the flow of water. A 4" cap 130 may fit inside the 4" diameter chamber 110 for ease of removal and replacement. In addition, the cap 130 may have a small low-profile handle 160 on top to aid in removal and replacement. The overall length of the root irrigation apparatus 100 may be 24" and there may be ½" irrigation apertures 140 equally spaced around the circumference and down the entire length of the chamber 110 and attachment body 120. This may allow the water flowing into the chamber 110 to seep into the surrounding dirt and nourish the roots of the trees and bushes. The root irrigation apparatus 100 may have a 24" flexible hose ½" diameter that may allow the user to connect the root irrigation apparatus 100 to an existing sprinkler system. The valve (420 of FIG. 4B) inside the chamber 110 may allow the user to control the flow of water both for standalone units as well as in conjunction with a mixed sprinkler zone (bubblers, spray heads and deep watering devices) to balance pressure and flow.

In reference to FIG. 4A, a top-down view of an embodiment of a root irrigation apparatus according to some aspects of the present disclosure is seen. The cap 130 may be sized according to the diameter of the chamber 110. In some embodiments, the handle 160 may be located near the center of the cap 130, although placement of the handle 160 may be varied within the scope of the present disclosure. The cap 130 may, in some embodiments, include one or more irrigation cap-apertures 410. In some embodiments, the irrigation cap-apertures 410 may be configured to aid in removal of the cap 130. As depicted, the cap 130 may, generally, be round with a lobe or extension sized according to the location and size of the port 150. As will be appreciated by one skilled in the art, the size and geometry of the cap 130 may be varied within the scope of the present disclosure to meet varying design needs. Likewise, the composition and construction of the cap 130 may be varied according to design demands or other factors, such as cost of construction, that will be understood by one skilled in the art.

Now referring to FIG. 4B, the figure depicts a schematic view, from a top-down perspective, of an embodiment of a root irrigation apparatus 100 according to some aspects of the present disclosure. In some embodiments of the present disclosure, a valve 420 may be operably connected to the first end 112 of the chamber 110. The valve 420 may, in some embodiments, be operably coupled to a port 150 to facilitate controlled water flow into the chamber 110. The valve 420 may, in some embodiments, be a valve to control the water flow and may have an adjustable flow rate. An adjustable valve 420, according to some aspects of the present disclosure, is described in more detail below in regard to FIGS. 9-12E.

The root irrigation apparatus 100 may maximize the use of water by delivering it under ground, where there may be less evaporation. Depending on the soil conditions, absorption versus gallons per minute may be a challenging balance. As such, the valve 420 may, in some embodiments, help to adjust the flow rate to provide an effective amount of water in during the sprinkler cycle. Every tree and shrub may need a different amount of water and the root irrigation apparatus 100 may allow the user to adjust for the watering needs of each tree or shrub. Additionally, because the root irrigation apparatus 100 may be used in conjunction with other irrigation or sprinkler devices, the root irrigation apparatus 100 may use the valve 420 integrate and balance with existing irrigation systems without requiring significant modification of the existing systems.

As a non-limiting example, the valve 420 may be ½" check valve with a volume control valve incorporated into it. Some other embodiments may have a special right angle valve that may allow water to flow down and not across the chamber 110. The valve 420 may prevent backflow and deliver water or other fluids at a rate of 0.125 to 2 GPM (at 40-80 psi) to give each shrub and tree the ideal amount of water. As will be appreciated by one skilled in the art, the rate of fluid flow and pressure delivered by the valve 420 may be varied to meet the demands of different systems and environments, and thus different geometries, sizes, and types of valves may be used within the scope of the present disclosure.

The valve 420 may, in some embodiments, be located inside the chamber 110 and protected from the elements. As such, in some embodiments, the valve 420 is configured to be housed within an interior volume of the chamber 110 and communicably coupled to the port 150 connected to the first end 112 of the chamber 110.

Now referring to FIG. 5, a bottom-up view of an embodiment of a root irrigation apparatus 100 according to some aspects of the present disclosure is seen. A bottom-cap 510 may, in some embodiments, be coupled to the end of a final attachment body 120. In some embodiments, the bottom-cap 510 may be used to seal the portion of the root irrigation apparatus 100 intended to be located at the lowest point, or bottom, of a hole where the root irrigation apparatus 100 is installed. In some embodiments, the bottom-cap may include one or more bottom-apertures 520. In some embodiments, the bottom-apertures 520, may function similar to the irrigation apertures 140 of the chamber and allow for fluid deliver to the soil beneath the root irrigation apparatus 100.

Also depicted are chamber threads 530 of the chamber 110. The chamber threads 530 may, in some embodiments, be configured to mate with the threads 170 of an extension body 120. In some telescoping embodiments, the chamber threads 530 may also be referred to as a first threaded portion on a surface of the chamber 110. As such, while depicted on an interior surface in FIG. 5, it is within the scope of the present disclosure to include the chamber threads on an exterior surface of the chamber 110. An embodiment with this feature is depicted in FIG. 8. As will be appreciated by one skilled in the art, any arrangement and geometry of the threads 170 and chamber threads 530 may be used within the scope of the present disclosure.

Now referring to FIG. 6, a perspective view of an embodiment of an extension body 120 according to some aspects of the present disclosure is seen. An upper end 620 configured to couple to the chamber 110 may, in some embodiments, be included in the attachment body 120. The upper end 620 may be sized to fit closely to, and in some embodiments seal up against, the interior or the chamber 110. The upper end 620 may also be shaped to allow the threads 170 of the extension body to mate with the chamber threads 530 of the chamber 110.

Also depicted herein is an arrangement of irrigation apertures 140 along the length of the attachment body 120. As will be appreciated by one skilled in the art, various arrangements of irrigation apertures 140 may be used within the scope of the present disclosure. In some embodiments a mesh covering (not depicted) may be used to prevent soil from entering into the root irrigation apparatus 100 through the irrigation apertures 140.

Figure 7:
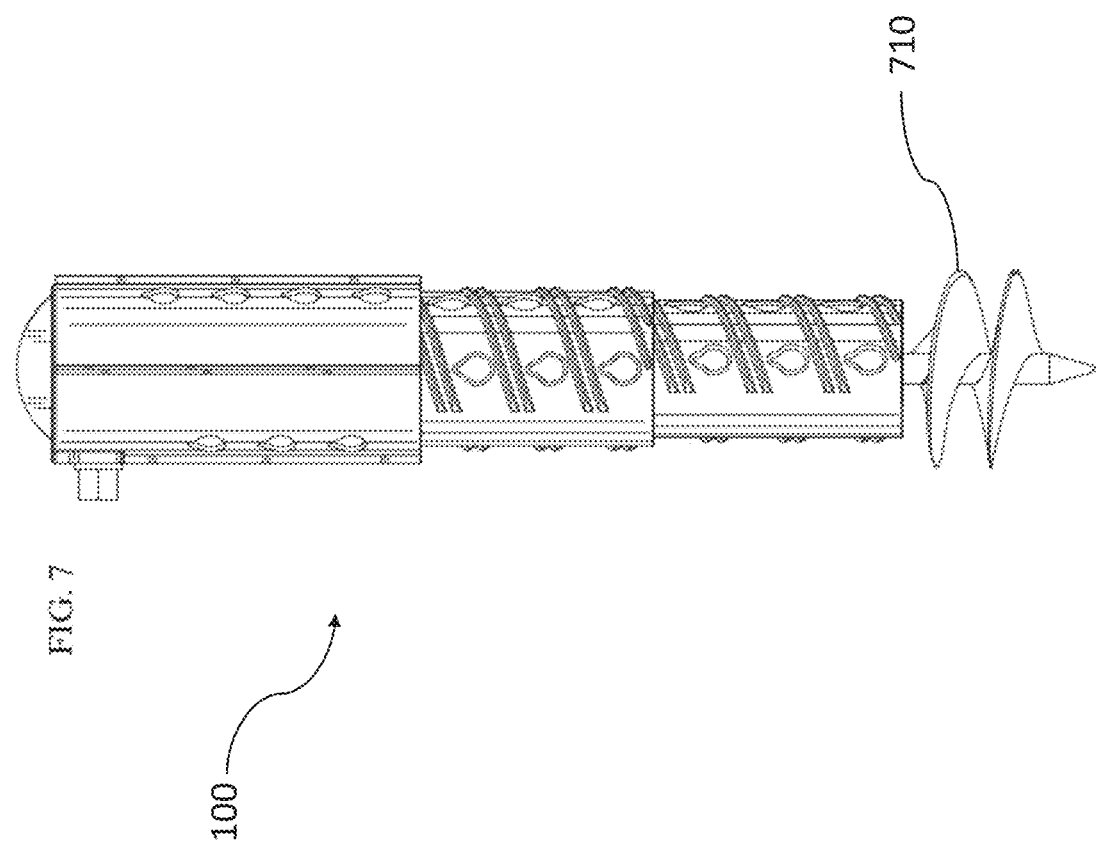
FIG. 7 is a lateral view of an embodiment of a root irrigation apparatus including an auger according to some aspects of the present disclosure.

Now referring to FIG. 7, a lateral view of an embodiment of a root irrigation apparatus 100 including an auger 710 according to some aspects of the present disclosure is seen. In some embodiments the auger 710 may be coupled to the bottom-cap 510 or to a lower portion of the attachment body 120. In other embodiments, the auger 710 may be coupled to a lower portion of the chamber 110. The auger 710 may be varied in size and geometry as will be appreciated by one skilled in the art, with a non-limiting example being a 5" screw. The auger 710 may assist a user in placing the root irrigation apparatus 100 in tough soil. In some embodiments, the chamber 110 may be fitted with rods (not depicted) or other extensions to provide a user with increased leverage when using the auger 710. In some other embodiments, the irrigation apertures 140 of the chamber may be sized and space to allow for the passage of a rod through the chamber 110 to facilitate increased leverage for the user.

Now referring to FIG. 8, a lateral view of another embodiment of a root irrigation apparatus 800 according to some aspects of the present disclosure is seen. As depicted, the length of a chamber 810 extending beyond the attachment body 820 may be set according to an amount of the second threaded portion 870 of the attachment body 820 mated to the first threaded portion 840 of the chamber 110. As described above, the embodiment shown here is a reverse of the embodiment depicted in FIG. 1 in regard to the telescopic construction of root irrigation apparatus 800. That is, the chamber 810 has a smaller diameter than the attachment body 820 and is configured to fit within the attachment body 820. Like the previously described embodiments, the chamber 810 and attachment body 820 may have irrigation apertures 830.

As will be appreciated by one skilled in the art, although the sizing and arrangement of the components mechanically coupling the chamber 810 and attachment body 820 differ from the previously described embodiments, the materials used and methods of construction for the components may remain the same.

As a non-limiting example, some embodiments may allow a user to set an overall length of the root irrigation apparatus 800 using the chamber threads 840 between lengths of 12-24 inches. In some other embodiments, this range may be increased to 12-36 inches. In still other embodiments, this range may be increased to 12-48 inches. As will be appreciated by one skilled in the art, variations in size and length of the chamber 810 and attachment body 820 are contemplated within the scope of the present disclosure.

As described before regarding embodiments like those shown in FIG. 1, embodiments similar to the embodiment depicted in FIG. 8 may also include an auger 710. The auger 710 may be varied in size and geometry, as will be appreciated by one skilled in the art, with a non-limiting example being a 5" screw. The auger 710 may assist a user in placing the root irrigation apparatus 100 in tough soil. In some embodiments, the chamber 110 may be fitted with rods (not depicted) or other extensions (not depicted) to provide a user with increased leverage when using the auger 710.

Referring now to FIG. 9, a schematic view from a lateral perspective of an adjustable valve 900 according to some to aspects of the present disclosure is shown. As shown, the adjustable valve 900 may include a valve body 910, a valve piston 920, a valve nut 930, and a valve handle 940. One skilled in the art will appreciate that water is intended, in the embodiment shown, to flow into the adjustable valve 900 through the valve nut 930. Incoming water may then have its flow regulated within the valve body 910 by the valve piston 920 which is adjusted via the valve handle 940. Flow-controlled water, or other fluids, may then, in some embodiments, proceed out of the adjustable valve 900.

Figure 10A:
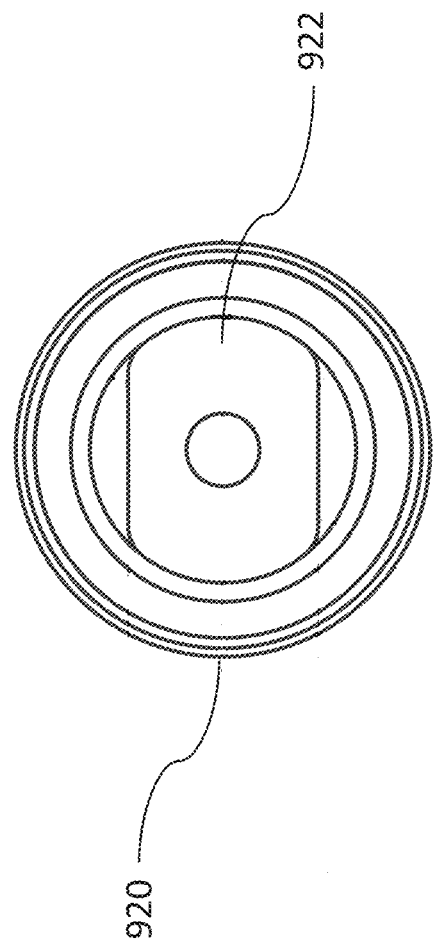
FIG. 10A is a schematic view from a top-down perspective of a valve piston of an adjustable valve according to some to aspects of the present disclosure.

Turning to FIG. 10A, a schematic view from a top-down perspective of a valve piston 920 of an adjustable valve 900 according to some to aspects of the present disclosure is shown. The valve piston 920 may, in some embodiments, have a substantially cylindrical shape to facilitate rotation. The valve piston 920 may also, in some other embodiments, feature a handle attachment point 922 to couple to a valve handle 940 (not shown).

Figure 10B:
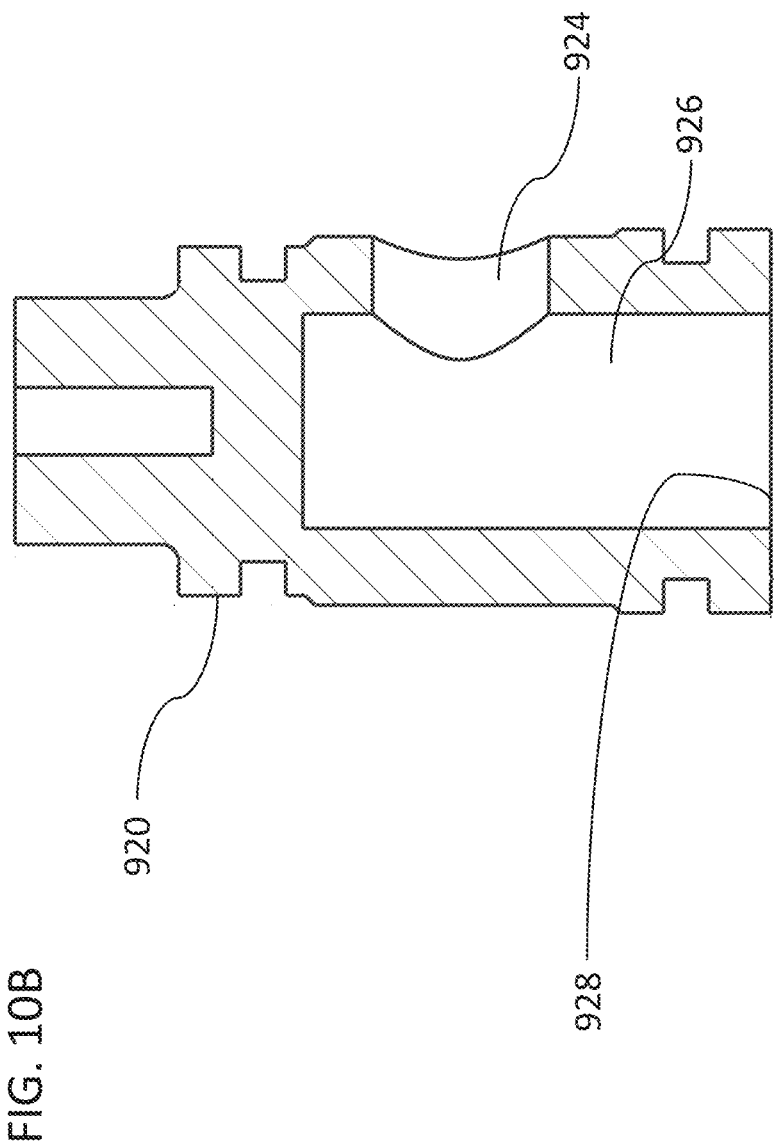
FIG. 10B is a cross-sectional view from a lateral perspective of a valve piston of an adjustable valve according to some to aspects of the present disclosure.

Turning now to FIG. 10B, a cross-sectional view from a lateral perspective of a valve piston 920 of an adjustable valve 900 according to some to aspects of the present disclosure is shown. The valve piston 920 may, in some embodiments, feature an inlet 924 connecting the exterior of the valve piston 920 to an interior cavity 926. In some embodiments, the inlet 924 may be round in shape. However, as will be appreciated by one skilled in the art, any suitable shape for communicating incoming water into the interior chamber 926 may be used within the scope of the present disclosure. Likewise, the interior cavity 926 may have a outlet 928 and be cylindrical in shape. However, any shape known to be suitable by one skilled in the art may be used within the scope of the present disclosure.

Figure 10C:
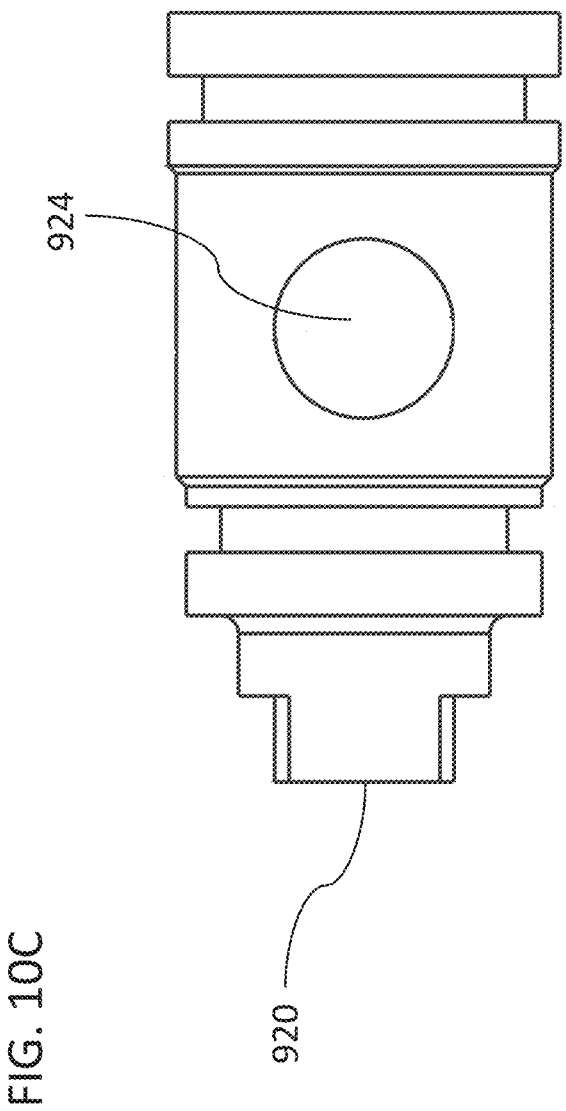
FIG. 10C is a lateral view of a valve piston of an adjustable valve according to some to aspects of the present disclosure.

Referring now to FIG. 10C, a lateral view of a valve piston 920 of an adjustable valve 900 according to some to aspects of the present disclosure is shown. Here, the inlet 924 leading into the interior cavity 926 (not shown) can be seen.

Figure 10D:
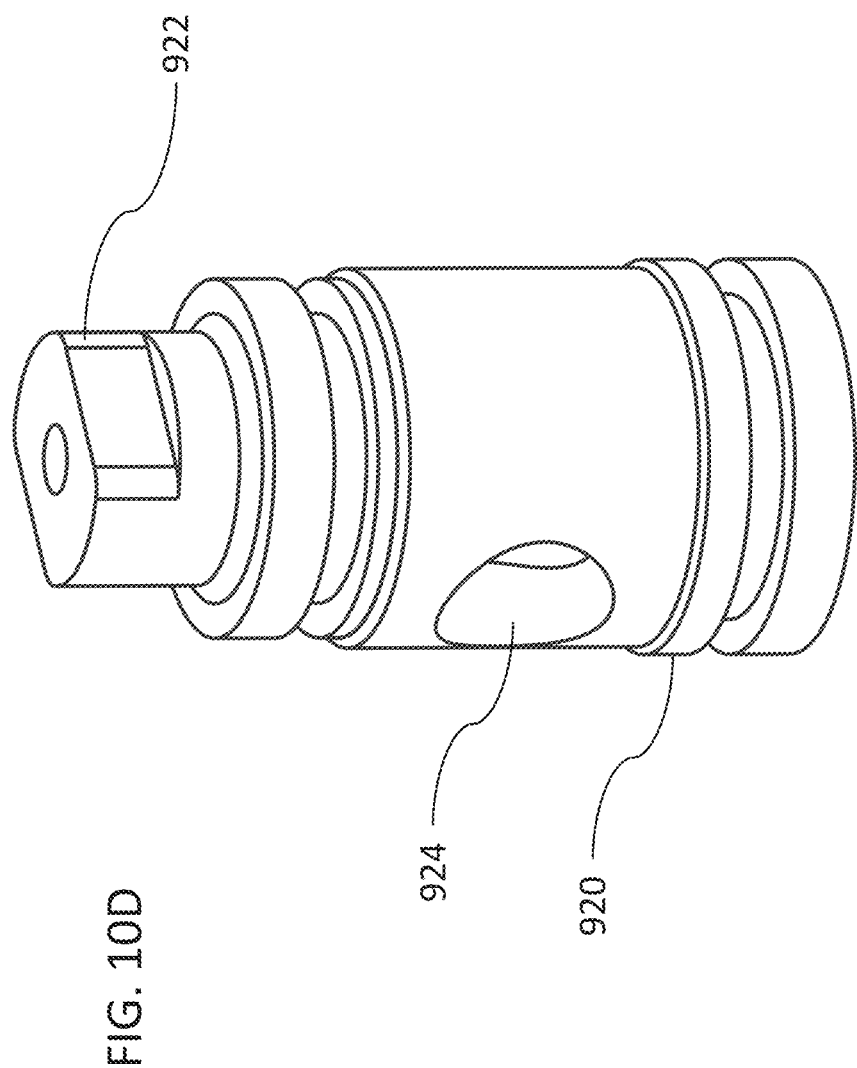
FIG. 10D is a perspective view of a valve piston of an adjustable valve according to some to aspects of the present disclosure.

Turning to FIG. 10D a perspective view of a valve piston 920 of an adjustable valve 900 according to some to aspects of the present disclosure is shown. Here, the inlet 924 leading into the interior cavity 926 (not shown) can be seen. Additionally, the handle attachment point 922 can be seen.

Figure 11A:
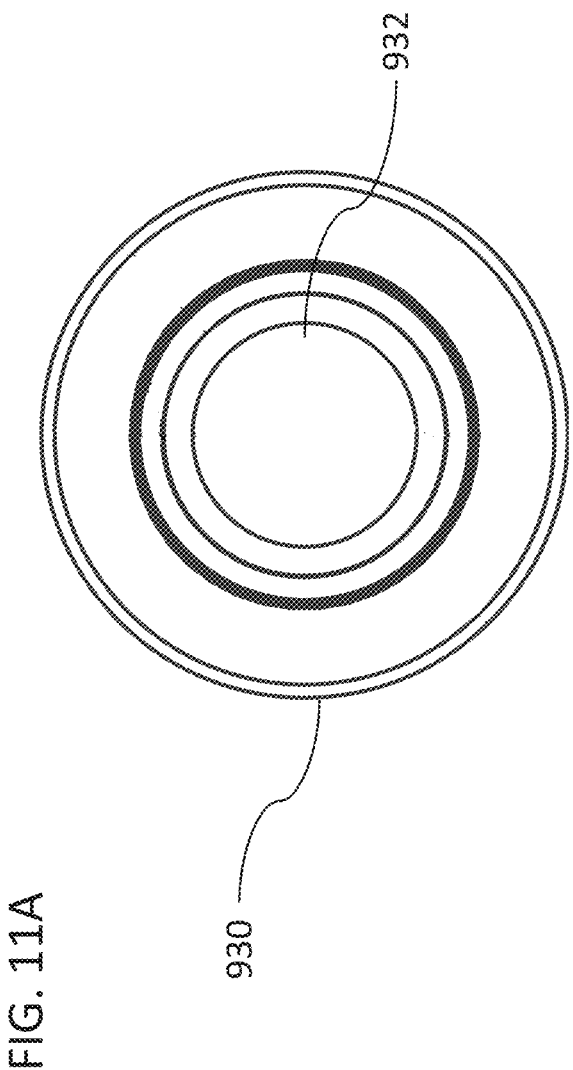
FIG. 11A is a schematic view from a top-down perspective of a valve nut of an adjustable valve according to some to aspects of the present disclosure.

Moving to FIG. 11A, a schematic view from a top-down perspective of a valve nut 930 of an adjustable valve 900 according to some to aspects of the present disclosure is shown. The valve nut 930 may, in some embodiments, be coupled to the valve body 910 (not shown) and be configured to communicably flow water into the valve body 910 (not shown) via a channel 932. The channel 932 may, in some embodiments, be sized to match the diameter of the inlet 924 (not shown) of the valve piston 920 (not shown). Furthermore, in some other embodiments, the channel 932 may be configured to couple to the valve piston 920 and allow for flow rate control of the adjustable valve 900 by varying the amount of the inlet 924 (not shown) of the valve piston 920 (not shown) exposed to the channel 932.

In some embodiments, the valve nut 930 may include a threaded exterior portion 934 (not shown) and function as a port 150.

In some other embodiments, the valve nut 930 may have a threaded interior portion 936 (not shown) configured to couple to the valve body 910 (not shown).

Figure 11B:
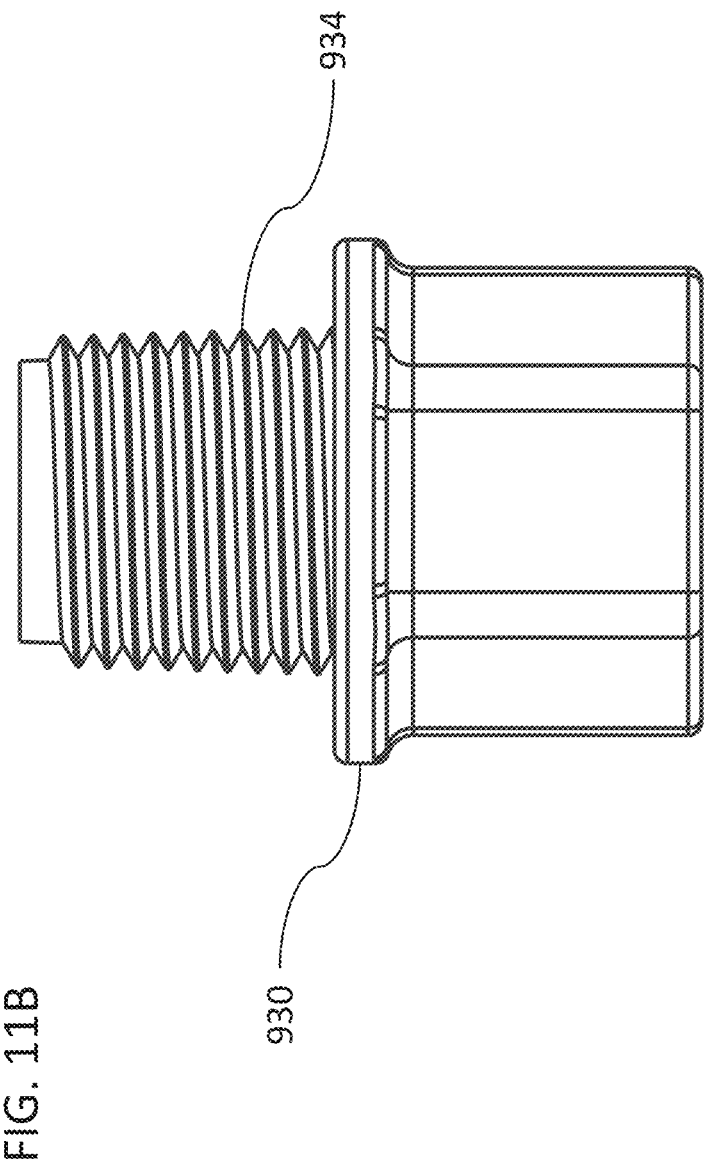
FIG. 11B is a lateral view of a valve nut of an adjustable valve according to some to aspects of the present disclosure.

Referring now to FIG. 11B, a lateral view of a valve nut 930 of an adjustable valve 900 according to some to aspects of the present disclosure is shown. Here the threaded exterior portion 934 is shown.

Figure 11C:
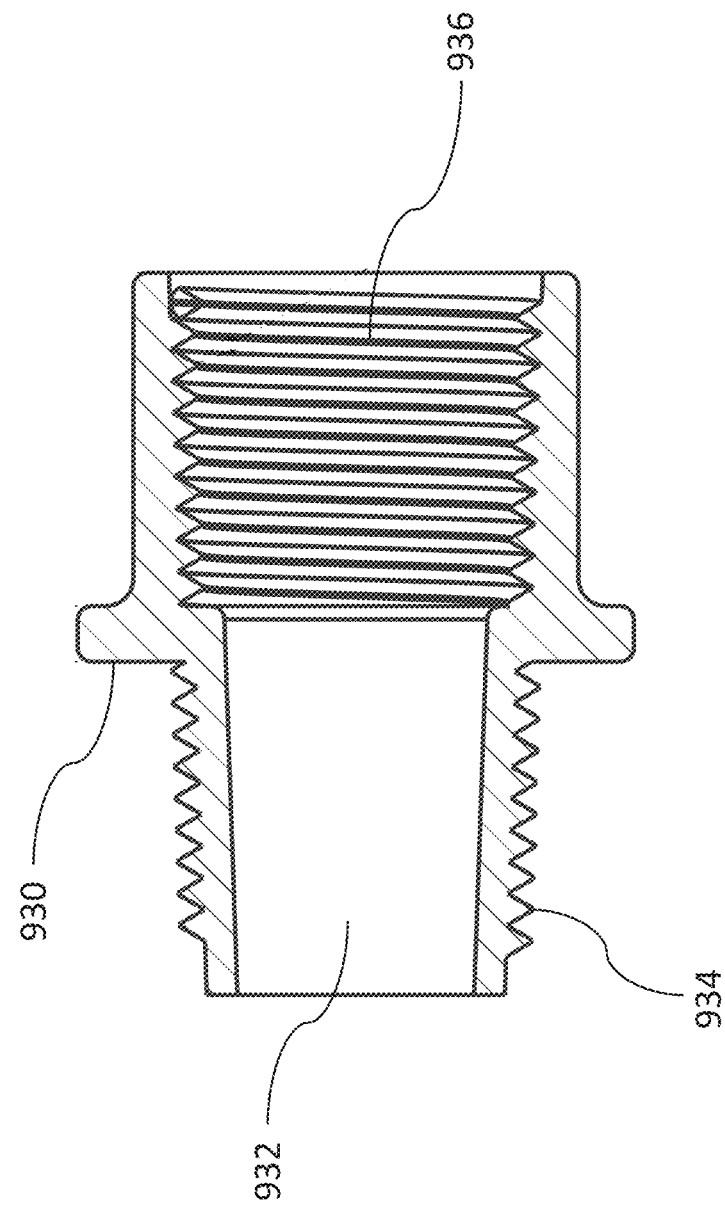
FIG. 11C is a cross-sectional view from a lateral perspective of a valve nut of an adjustable valve according to some to aspects of the present disclosure.

Turning to FIG. 11C, a cross-sectional view from a lateral perspective of a valve nut 930 of an adjustable valve 900 according to some to aspects of the present disclosure is shown. Here the channel 932 is depicted as traversing through the valve nut 930 from left to right. The diameter of the channel 932 may be constant or, in some embodiments, the diameter may be varied. As will be appreciated by one skilled in the art, any suitable size and shape for the channel 932 may be used within the scope of the present disclosure. The threaded exterior portion 934 and threaded interior portion 936 are also depicted.

Figure 11D:
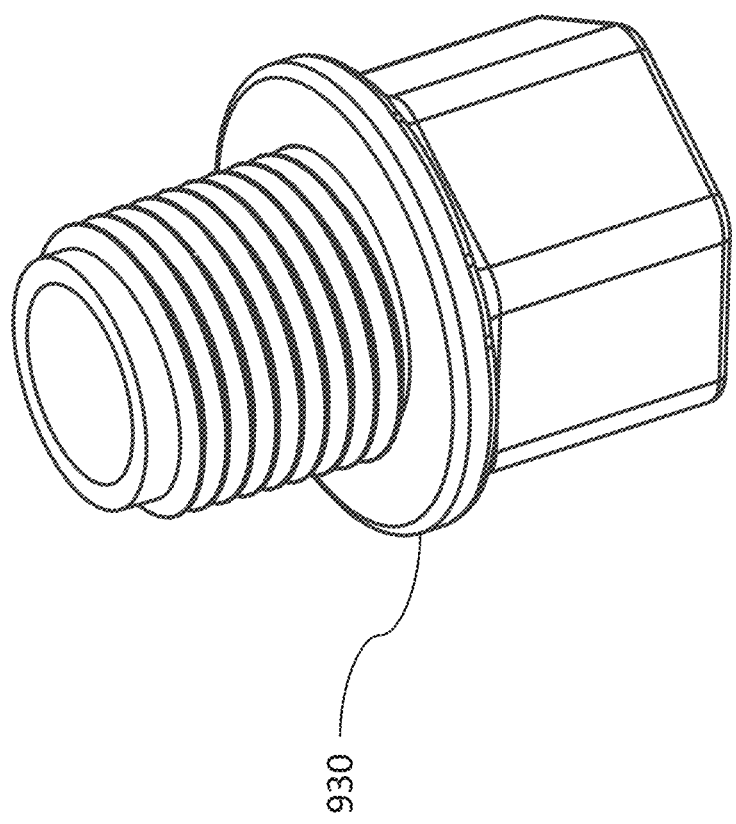
FIG. 11D is a perspective view of a valve nut of an adjustable valve according to some to aspects of the present disclosure.

Turning now to FIG. 11D, a perspective view of a valve nut 930 of an adjustable valve 900 according to some to aspects of the present disclosure is shown.

Figure 12A:
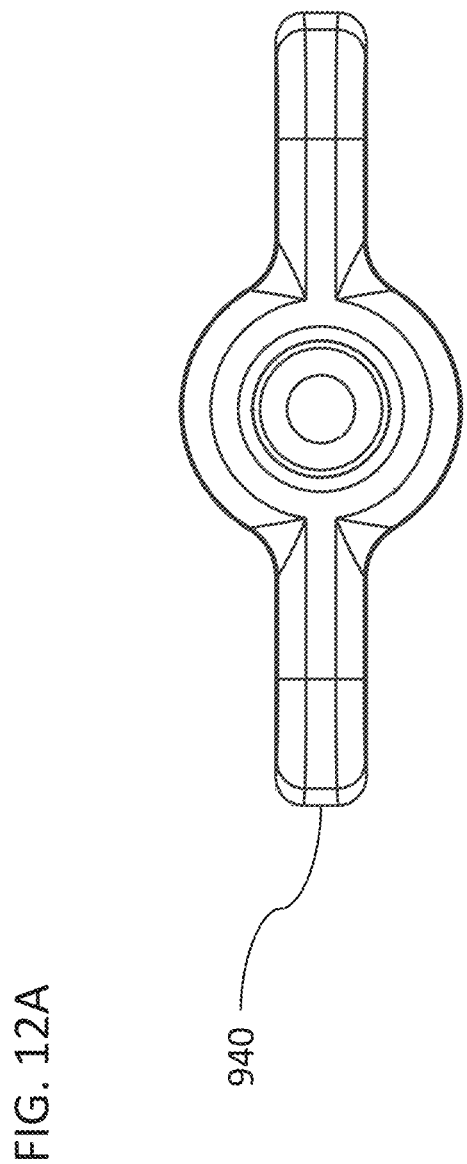
FIG. 12A is a top-down view of a valve handle of an adjustable valve according to some to aspects of the present disclosure.

Moving to FIG. 12A, a top-down view of a valve handle 940 of an adjustable valve 900 according to some to aspects of the present disclosure is shown. The valve handle 940 may, in some embodiments, be configured to couple to the valve piston 920 (not shown) to facilitate flow control adjustment for the adjustable valve 900. The valve handle 940 may have one or more arms. However, as will be appreciated by one skilled in the art, any suitable size and geometry may be used for the valve handle 940. Generally, having an arm or surface that can be turned by a user that is located farther from the center of rotation, at a point where the valve handle is 940 coupled to the valve piston 920 (not shown), will increase the leverage available for applying torque to the valve piston 920 (not shown).

Figure 12B:
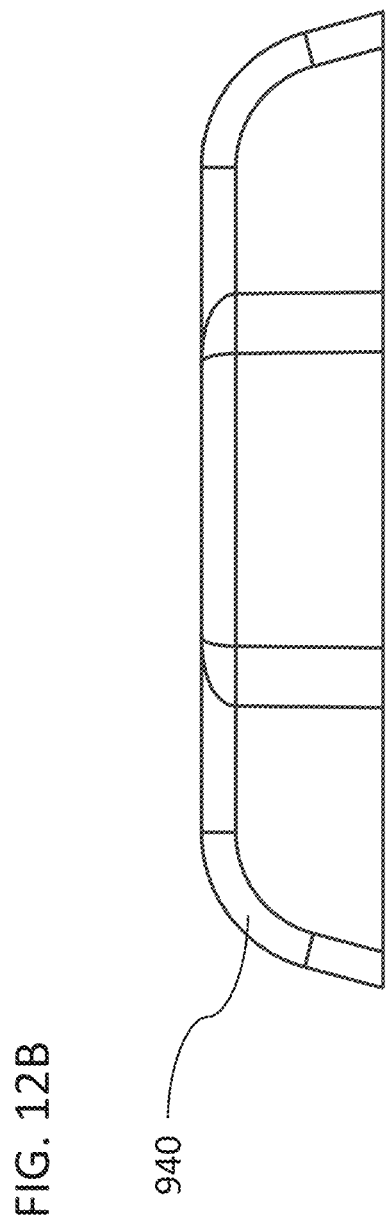
FIG. 12B is a schematic view from a lateral perspective of a valve handle of an adjustable valve according to some to aspects of the present disclosure.

Referring now to FIG. 12B, a schematic view from a lateral perspective of a valve handle 940 of an adjustable valve 900 according to some to aspects of the present disclosure is shown.

Figure 12C:
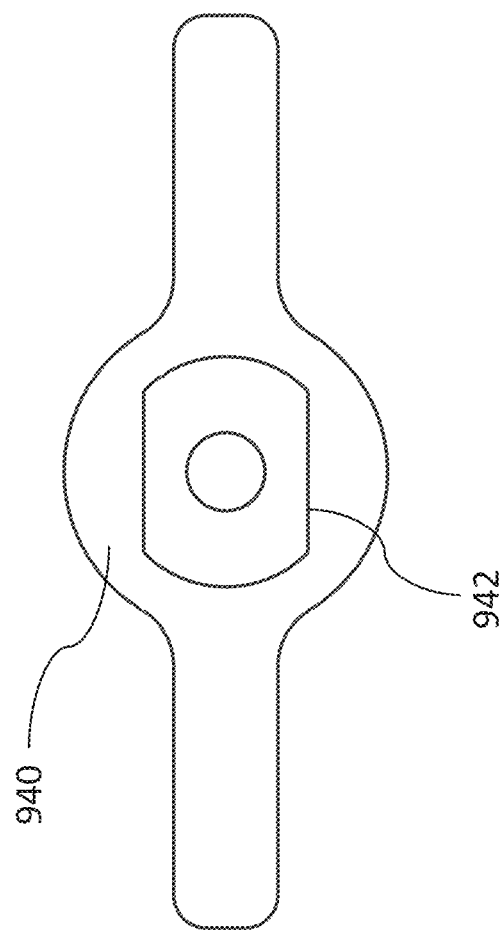
FIG. 12C is a schematic view from a top-down perspective of a valve handle of an adjustable valve according to some to aspects of the present disclosure.

Moving to FIG. 12C, a schematic view from a top-down perspective of a valve handle 940 of an adjustable valve 900 according to some to aspects of the present disclosure is shown. Here, the handle attachment point 942 for coupling the valve handle 940 to the valve piston 920 is depicted in the center of the valve handle 940. In some embodiments the handle attachment point 942 may be configured to couple to the attachment point 922 (not shown) of the valve piston 920 (not shown).

Figure 12D:
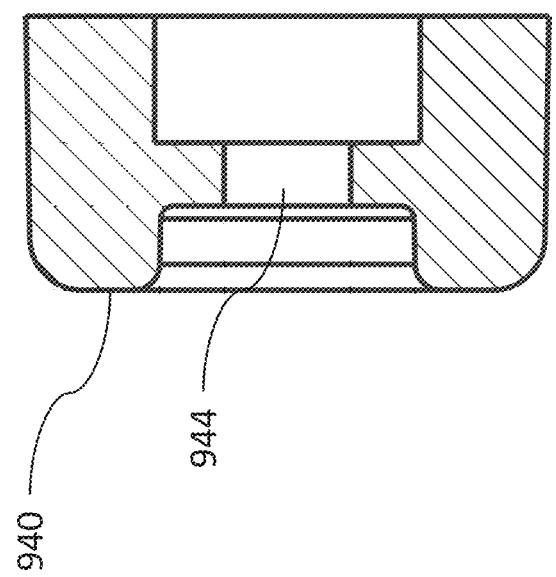
FIG. 12D is a cross-sectional view from a lateral perspective of a valve handle of an adjustable valve according to some to aspects of the present disclosure.

Turning to FIG. 12D, a cross-sectional view from a lateral perspective of a valve handle 940 of an adjustable valve 900 according to some to aspects of the present disclosure is shown. Here a handle-cavity 944 is depicted as traversing through the valve handle 940. In some embodiments, the handle-cavity 944 may be configured to allow for a pin or screw to secure the valve handle 940 at the handle attachment point 942 to the valve piston 920 (not shown). In some embodiments, the handle-cavity 944 may be threaded.

Figure 12E:
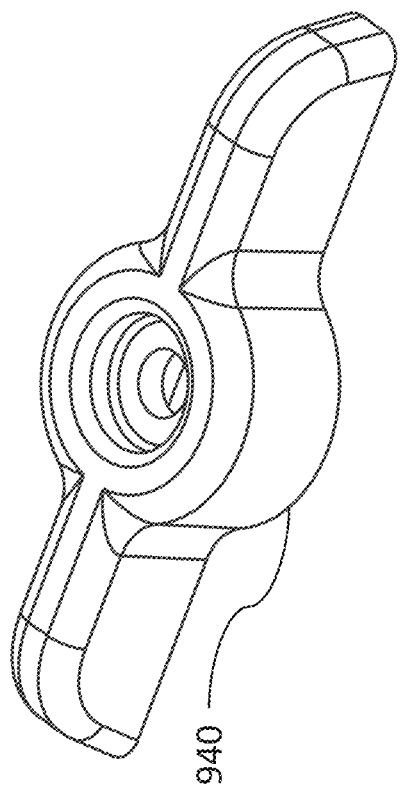
FIG. 12E is a perspective view of a valve handle of an adjustable valve according to some to aspects of the present disclosure.

Moving to FIG. 12E, a perspective view of a valve handle 940 of an adjustable valve 900 according to some to aspects of the present disclosure is shown.

In order to install the root irrigation apparatus 100, the user may determine the demands for each bush and plant based on their root system. Then the user may adjust the root irrigation apparatus 100 to the proper depth (length). Next the user may dig a hole at the drip line of the tree or bush, being careful not to disturb existing roots. Then, the user may place the root irrigation apparatus 100 in the hole and set the depth of the cap 130 to be approximately level with the surrounding ground. Finally, the user may fill around the root irrigation apparatus 100 with ¾" gravel to aid in root system aeration and to keep the surrounding dirt from back flowing into the chamber 110.

Once the root irrigation apparatus 100 is connected to an existing irrigation zone, the user may turn on the water to that zone and adjust the valve 420 to balance the amount of water filling the chamber 110 in conjunction with the desired length of time for the root irrigation apparatus 100 to be run in that zone. Once the volume is set, the user may close the cap 130.

The user may use the root irrigation apparatus 100 to fertilize by opening the cap 130 and pouring in the desired amount of a suitable type of fertilizer. The root irrigation apparatus 100 may allow for fertilizing at the roots and may result in minimal loss of concentration or burning of the top roots. The fertilizer may be effectively diluted and distributed to the plants' or trees' root systems during use.

Another non-limiting example of a method for installing a root irrigation apparatus 100 method may include determining a root system depth, digging a hole with a depth matching the root system depth in a ground surface, adjusting a length of the root irrigation apparatus 100 to substantially match the root system depth, placing the root irrigation apparatus 100 into the hole with a cap 130 of the root irrigation apparatus 100 being substantially level with the ground surface, and filing in a remaining volume of the hole.

The hole may be dug using any suitable means known to one skilled in the art.

Measurement of the depth of the hole may be performed using a measuring stick or tape or any other means, such as an electronic measuring device, as would be known to one skilled in the art.

Adjustment of the length of the root irrigation apparatus 100 to substantially match the root system depth may, in some embodiments, be performed by varying an amount of a first threaded portion 530 of a chamber 110 of the root irrigation apparatus 100 mated to a second threaded portion 170 of an attachment body 120 of the root irrigation apparatus 100 by twisting the attachment body 120 of the root irrigation apparatus 100 relative to the chamber 110 of the root irrigation apparatus 100. Similar adjustment may be made for embodiments, using the corresponding components, of the root irrigation apparatus 800 depicted in FIG. 8.

In some embodiments of the method described above, a pipe or tube connected to an existing irrigation system may be operably coupled to a port 150 of the root irrigation device 100. Coupling to the pipe or tube may establish a water supply for the root irrigation device 100. Once a water supply has been connected, in some embodiments, the flow rate of a valve 420 of the root irrigation apparatus 100 may be adjusted to meet the requirements of the user.

After the root irrigation apparatus 100 has been placed in the hole, the remaining volume of the hole may be filed in using previously removed soil, gravel, or other suitably permeable material to allow for water to be delivered to the root system. As a non-limiting example, ¾" gravel may be used to fill the remaining volume of the hole. The remaining volume of the hole may be, in some embodiments, filled until the original surface level has been reached. However, it is within the scope of the present disclosure that the remaining volume of the hole be filled in up to a level above or below the original surface level to meet the needs of a user.

In applications where more than one root irrigation apparatus 100 may be installed and connected in series along an irrigation line, the previously described method may further include installing a T-fitting to each root irrigation apparatus 100 except the final root irrigation apparatus 100 connected along the irrigation line. Then, the irrigation line may be connected into and out of each of the T-fittings. Finally, the flow rate for each valve 420 of each root irrigation apparatus 100 may be adjusted in sequence along the irrigation line. Alternatively, the flow rate for each valve 420 of each root irrigation apparatus 100 may be adjusted in any sequence.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A telescoping root irrigation apparatus, comprising:
    a chamber comprising:
        a first end;
        a second end;
        an interior chamber volume;
        an irrigation aperture; and
        a first threaded portion progressing axially along a first surface of the chamber;
    a valve operably connected to the first end of the chamber;
    a cap configured to couple to the first end of the chamber; and
    an attachment body having a second surface comprising a second threaded portion progressing axially along the second surface of the attachment body configured to engage and form a friction fit along the first threaded portion of the chamber and an interior attachment body volume;
    wherein the attachment body is further configured to telescopically retract into the chamber along the engaged first threaded portion and the second threaded portion and thereby combine the interior chamber volume and the interior attachment body volume into a continuous telescoping root irrigation apparatus volume.

2. The telescoping root irrigation apparatus of claim 1, wherein a length of the attachment body extending beyond the chamber is set according to an amount of the second threaded portion of the attachment body engaged to the first threaded portion of the chamber.

3. The telescoping root irrigation apparatus of claim 1, wherein a length of the chamber extending beyond the attachment body is set according to an amount of the second threaded portion of the attachment body engaged to the first threaded portion of the chamber.

4. The telescoping root irrigation apparatus of claim 1, wherein the attachment body further comprises an auger.

5. The telescoping root irrigation apparatus of claim 1, wherein the valve is configured to be housed within an interior volume of the chamber and is communicably coupled to a port connected to an exterior surface of the first end of the chamber.

6. The telescoping root irrigation apparatus of claim 5, wherein the valve comprises a check valve.

7. The telescoping root irrigation apparatus of claim 5, wherein the valve comprises a right-angle valve.

* * * * *